US009942665B2

(12) United States Patent
Kanemaki et al.

(10) Patent No.: US 9,942,665 B2
(45) Date of Patent: Apr. 10, 2018

(54) ELECTRONIC APPARATUS

(71) Applicant: KYOCERA Corporation, Kyoto-shi, Kyoto (JP)

(72) Inventors: Yasuhito Kanemaki, Katano (JP); Norikazu Morioka, Tama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/191,341

(22) Filed: Jun. 23, 2016

(65) Prior Publication Data

US 2016/0309263 A1 Oct. 20, 2016

Related U.S. Application Data

(63) Continuation of application No. PCT/JP2014/083912, filed on Dec. 22, 2014.

(30) Foreign Application Priority Data

Dec. 24, 2013 (JP) ................................ 2013-265339

(51) Int. Cl.
*H04R 17/00* (2006.01)
*G06F 1/16* (2006.01)
(Continued)

(52) U.S. Cl.
CPC .......... *H04R 17/00* (2013.01); *G06F 1/1626* (2013.01); *G06F 1/1688* (2013.01); *H04M 1/035* (2013.01);
(Continued)

(58) Field of Classification Search
None
See application file for complete search history.

(56) References Cited

U.S. PATENT DOCUMENTS

2009/0290746 A1* 11/2009 Miyata .................... H04R 7/08 381/388
2011/0032223 A1* 2/2011 Okamoto ............... G02F 1/167 345/204

(Continued)

FOREIGN PATENT DOCUMENTS

JP 2013-131987 A 7/2013

OTHER PUBLICATIONS

Dobrovinskaya et al, "Properties of Sapphire." pp. 1-123. 2009.*
(Continued)

*Primary Examiner* — Curtis Kuntz
*Assistant Examiner* — Qin Zhu
(74) *Attorney, Agent, or Firm* — Procopio Cory Hargreaves and Savitch LLP

(57) ABSTRACT

A cover member is made of a crystalline material, and includes a first main surface that faces a display surface of a display, and a second main surface opposite to the first main surface. A vibration element produces flexural vibrations, and is disposed on the first main surface of the cover member. The cover member is bent in a second direction more easily than in a first direction from the viewpoint of anisotropy of a crystalline structure of the crystalline material. The first direction is parallel to the first and second main surfaces, and the second direction is parallel to the first and second main surfaces and vertical to the first direction. The vibration element produces flexural vibrations along the second direction.

6 Claims, 10 Drawing Sheets

2
220
70
190
60
211
260
120
DR1
2b
50
20
DR2

(51) Int. Cl.
*H04M 1/03* (2006.01)
*H04R 7/04* (2006.01)
*H04R 3/00* (2006.01)

(52) U.S. Cl.
CPC ................. *H04R 7/04* (2013.01); *H04R 3/00* (2013.01); *H04R 7/045* (2013.01); *H04R 2499/11* (2013.01)

(56) References Cited

U.S. PATENT DOCUMENTS

| | | | | |
|---|---|---|---|---|
| 2012/0040721 | A1* | 2/2012 | Infanti | G06F 3/016 455/566 |
| 2013/0057499 | A1* | 3/2013 | Ando | G06F 3/038 345/173 |
| 2013/0168733 | A1* | 7/2013 | Iwanaga | C30B 29/406 257/190 |
| 2013/0222289 | A1* | 8/2013 | Kwak | G06F 3/041 345/173 |
| 2014/0077223 | A1* | 3/2014 | Choe | C30B 25/04 257/76 |
| 2014/0118446 | A1* | 5/2014 | Izumi | B41J 2/14233 347/70 |
| 2014/0241558 | A1* | 8/2014 | Yliaho | H04R 5/02 381/333 |
| 2015/0326967 | A1 | 11/2015 | Otani | |

OTHER PUBLICATIONS

Zhou et al, “Acoustic anisotropy of piezoelectric PbB4O7 crystals studied by laser ultrasonics.” pp. 1-5. 2001.*
International Search Report dated Mar. 31, 2015, issued for International Application No. PCT/JP2014-083912.
Written Opinion of the International Searching Authority issued by Japan Patent Office for International Application No. PCT/JP2014-083912.

* cited by examiner

F I G . 3
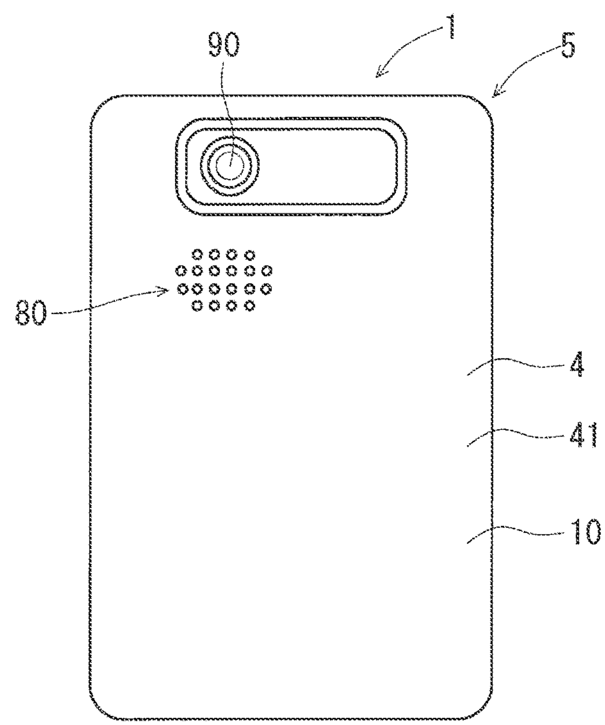
F I G . 4
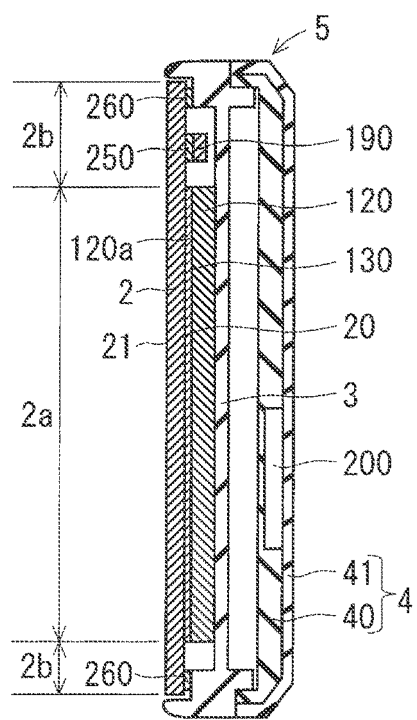

F I G. 5
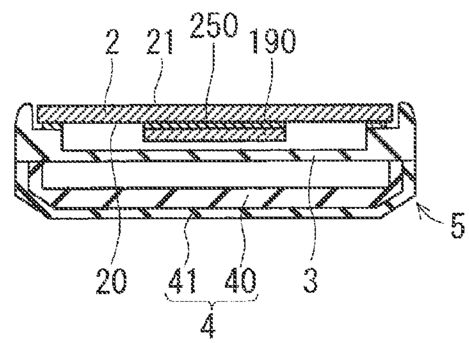
F I G. 6
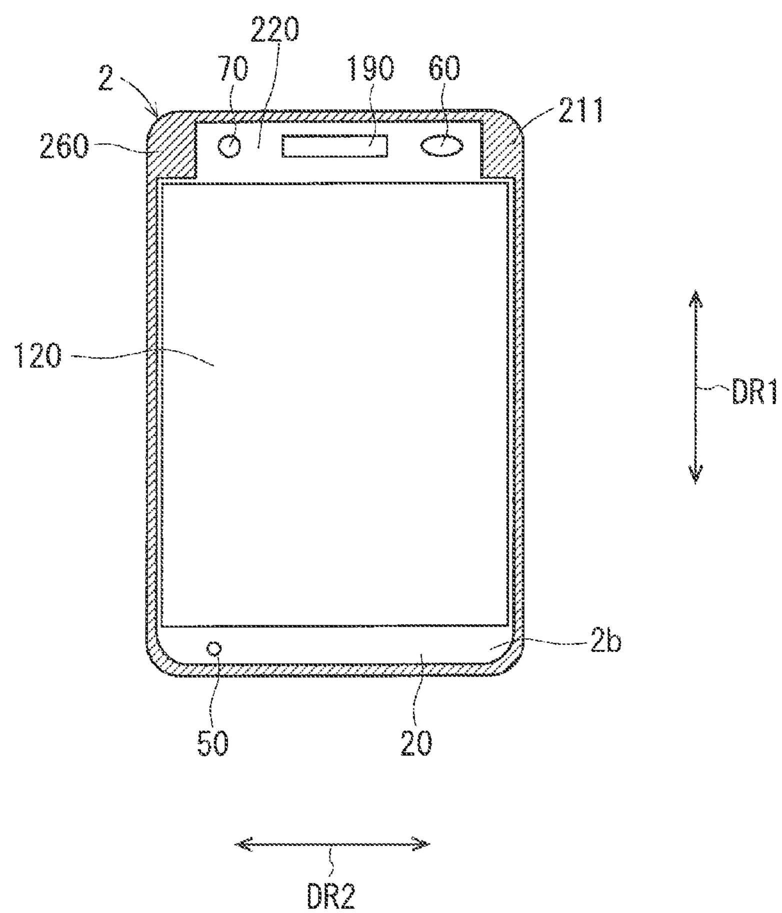

F I G . 7
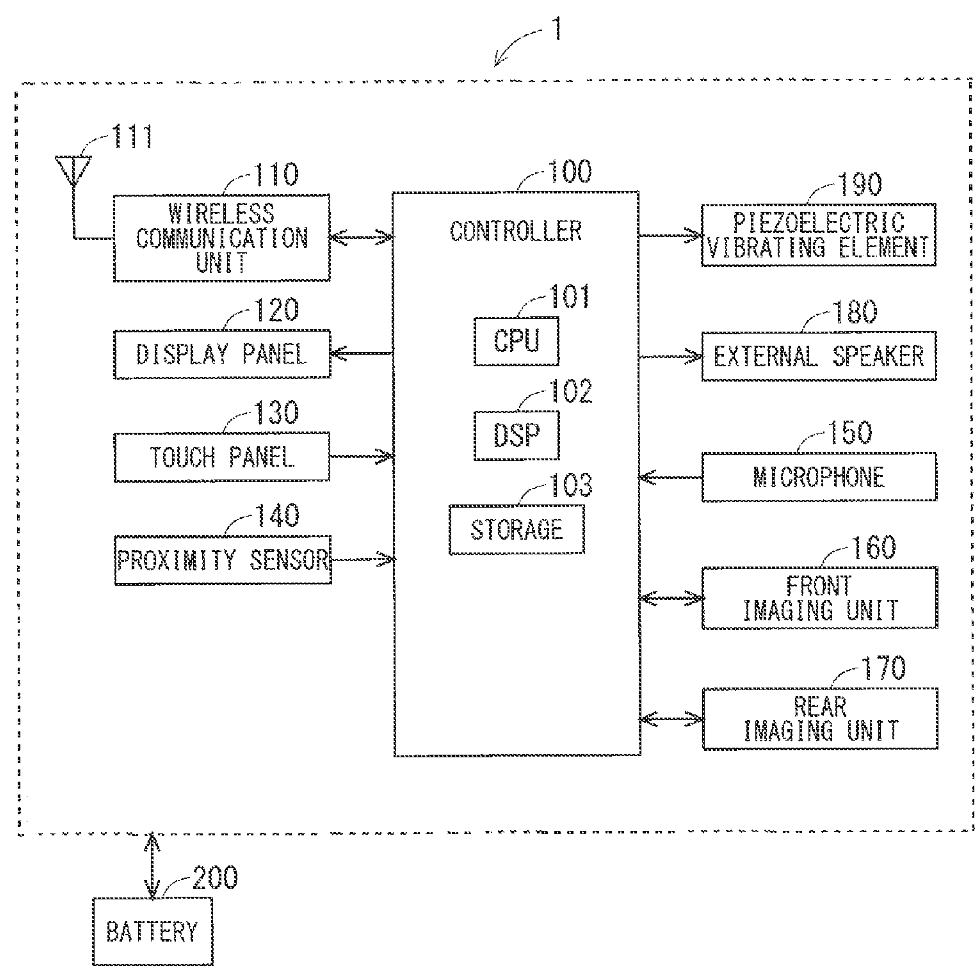

F I G . 1 2
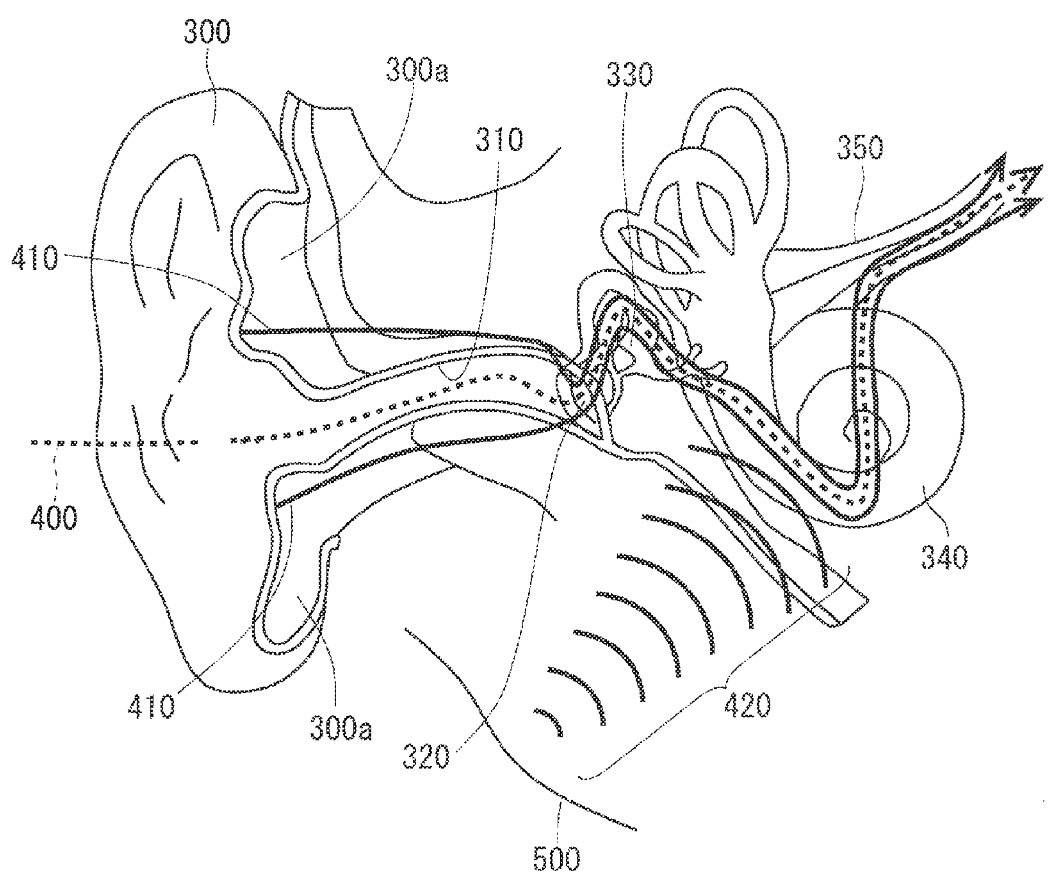

F I G . 1 3
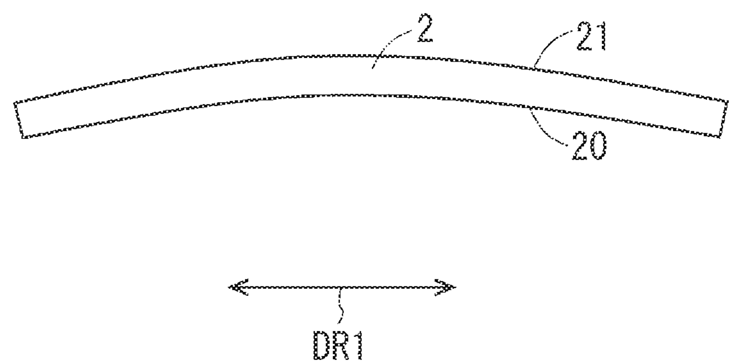
F I G . 1 4
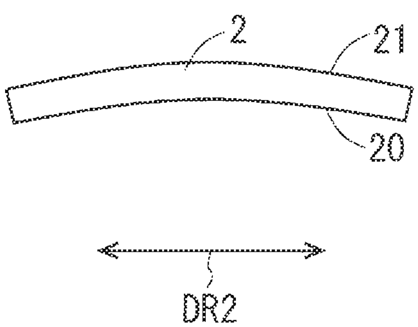

F I G. 1 8
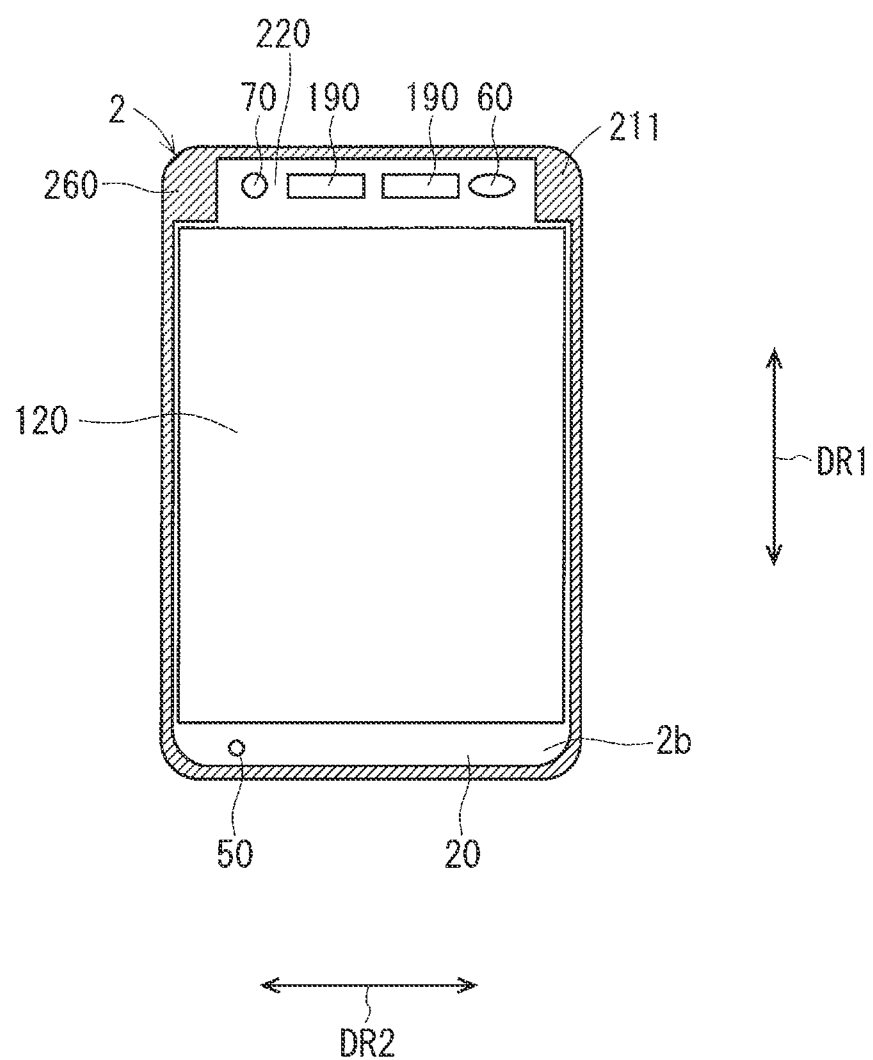

ELECTRONIC APPARATUS

CROSS-REFERENCE TO RELATED APPLICATIONS

The present application is a continuation of PCT Application No. PCT/JP2014/083912, filed on Dec. 22, 2014, which claims the benefit of Japanese Patent Application No. 2013-265339, filed on Dec. 24, 2013. PCT Application No. PCT/JP2014/083912 is entitled "ELECTRONIC DEVICE", and Japanese Patent Application No. 2013-265339 is entitled "ELECTRONIC APPARATUS". The contents of which are incorporated by reference herein in their entirety.

FIELD

Embodiments of the present disclosure relate to electronic apparatuses.

BACKGROUND

Various techniques concerning electronic apparatuses have conventionally been proposed.

SUMMARY

An electronic apparatus is disclosed. In one embodiment, an electronic apparatus includes a display, a cover member, and a vibration element. The cover member includes a first main surface that faces a display surface of the display, and a second main surface opposite to the first main surface, and is made of a crystalline material. The vibration element is disposed on the first main surface of the cover member, and produces flexural vibrations. The cover member is bent in a second direction more easily than in a first direction from the viewpoint of anisotropy of a crystalline structure of the crystalline material. The first direction is parallel to the first and second main surfaces, and the second direction is parallel to the first and second main surfaces and vertical to the first direction. The vibration element produces flexural vibrations along the second direction.

BRIEF DESCRIPTION OF DRAWINGS

FIG. 3 illustrates a rear view showing the external appearance of the electronic apparatus.

FIG. 4 illustrates a sectional structure of the electronic apparatus.

FIG. 5 illustrates a sectional structure of the electronic apparatus.

FIG. 6 illustrates a plan view showing a cover member when seen from its inner surface side.

FIG. 7 illustrates an electrical configuration of the electronic apparatus.

FIG. 12 illustrates a view for describing air conduction sound and tissue conduction sound.

FIG. 13 illustrates how a cover member is bent in a longitudinal direction.

FIG. 14 illustrates how the cover member is bent in a lateral direction.

FIG. 18 illustrates a plan view showing a cover member when seen from its inner surface side.

DETAILED DESCRIPTION

[External Appearance of Electronic Apparatus]

Figure 1:
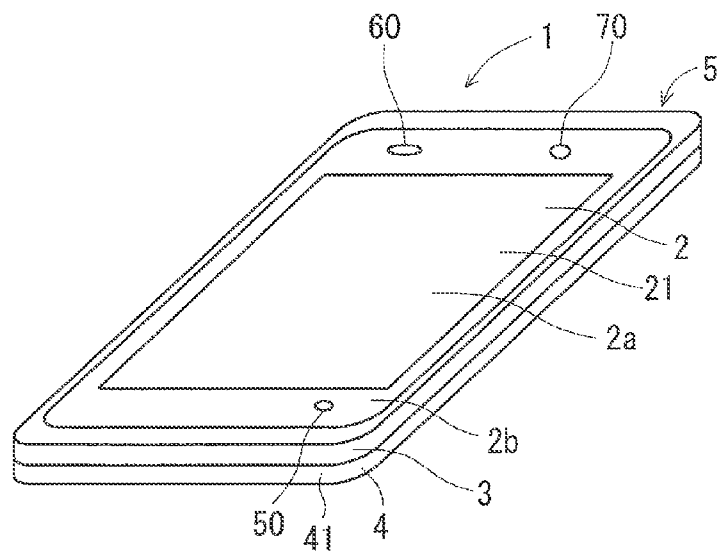
FIG. 1 illustrates a perspective view showing an external appearance of an electronic apparatus.
Figure 2:
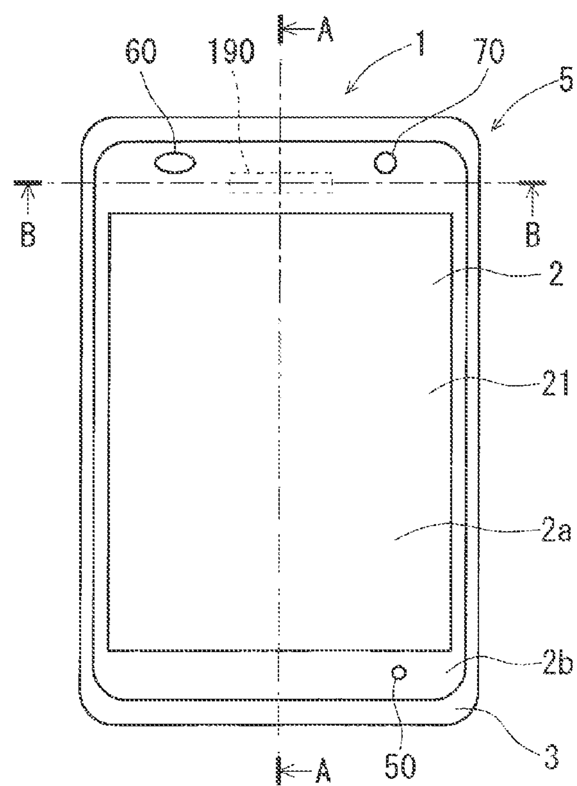
FIG. 2 illustrates a front view showing the external appearance of the electronic apparatus.

FIGS. 1, 2, and 3 illustrate a perspective view, a front view, and a rear view, respectively, showing an external appearance of an electronic apparatus 1. FIG. 4 schematically illustrates a sectional structure of the electronic apparatus 1, viewed along A-A indicated by arrows in FIG. 2. FIG. 5 schematically illustrates a sectional structure of the electronic apparatus 1, viewed along B-B indicated by arrows in FIG. 2. FIG. 6 illustrates a rear view of a cover member 2 included in the electronic apparatus 1. The cover member 2 illustrated in FIG. 6 is provided with a piezoelectric vibration element 190 and a display panel 120 of the electronic apparatus 1. The electronic apparatus 1 is a mobile phone, for example, a smart phone.

As illustrated in FIGS. 1 to 6, the electronic apparatus 1 includes the cover member (also referred to as a cover panel) 2 that covers a display surface 120*a* of the display panel 120 (FIG. 4), a front-side case 3 that supports the cover member 2, and a rear-side case 4 attached to the front-side case 3. The rear-side case 4 includes (i) a main case 40 which is attached to the front-side case 3 and in which a battery 200 is housed, and (ii) a cover member 41 which is attached to the main case 40 from the rear side of the electronic apparatus 1. The battery 200 housed in the main case 40 is covered with the cover member 41. The cover member 2, the front-side case 3, and the rear-side case 4 form an outer case 5 of the electronic apparatus 1. The electronic apparatus 1 has an approximately rectangular plate shape in a plan view.

The cover member 2 forms the front portion of the electronic apparatus 1, except the peripheral edge portion of the front portion. The front-side case 3 and the rear-side case 4 form the peripheral edge portion of the front portion of the electronic apparatus 1, the side surface portion of the electronic apparatus 1, and the rear surface portion of the electronic apparatus 1. Each of the front-side case 3 and the rear-side case 4 contains, for example, a resin and a metal. Examples of the resin forming the front-side case 3 and the rear-side case 4 include a polycarbonate resin, an ABS resin, and a nylon resin. Furthermore, examples of the metal include aluminum. The space enclosed by the front-side case 3 and the rear-side case 4 includes a printed circuit board (PCB) (not illustrated) on which various parts including a central processing unit (CPU) 101 and a digital signal processor (DSP) 102 to be described hereinafter are mounted.

The cover member 2 has a plate shape. In a plan view, the cover member 2 has an approximately rectangular shape. The cover member 2 has a first main surface 20 inside that faces the display surface 120*a* of the display panel 120, and a second main surface 21 outside that is opposite to the first main surface 20. The second main surface 21 is a part of the front surface of the electronic apparatus 1. Hereinafter, the first main surface 20 may be referred to as "inner surface 20", and the second main surface 21 may be referred to as "outer surface 21".

As illustrated in FIG. 6, the cover member 2 has an approximately rectangular shape that is longer in a first direction DR1 parallel to the inner surface 20 and the outer surface 21. Thus, assuming, to be a second direction DR2, a direction parallel to the inner surface 20 and the outer surface 21 and vertical to the first direction DR1, the length of the cover member 2 in the first direction DR1 is longer than the length of the cover member 2 in the second direction DR2. Hereinafter, the first direction DR1 may be referred to as "longitudinal direction DR1", and the second direction DR2 may be referred to as "short-side direction DR2".

The cover member 2 is made of sapphire. Sapphire is a single crystal mainly containing alumina ($Al_2O_3$), and is, herein, a single crystal having a purity of $Al_2O_3$ of approximately 90% or more. The purity of $Al_2O_3$ may be equal to or greater than 99% to provide a greater resistance to damage of the cover member and more reliably eliminates or reduces cracks or chipping. Examples of the other materials of the cover member 2 include crystalline materials such as diamond, zirconia, titania, crystal, lithium tantalite, and aluminum oxynitride. These materials may be single crystals having purities equal to or greater than 90% to provide a greater resistance to damage of the cover member and more reliably eliminates or reduces cracks or chipping.

The cover member 2 includes a transparent display portion (also referred to as a display window) 2*a* transmitting the display of the display panel 120. The display portion 2*a* has, for example, a rectangular shape in a plan view. The visible light output from the display panel 120 passes through the display portion 2*a* and is emitted to the outside of the electronic apparatus 1. The user visually recognizes information displayed on the display panel 120 through the display portion 2*a* from the outside of the electronic apparatus 1.

The major portion of a peripheral edge portion 2*b* of the cover member 2 that surrounds the display portion 2*a* is opaque and/or not transparent because of, for example, a film or the like attached thereto. Accordingly, the major portion of the peripheral edge portion 2*b* is a non-display portion that does not transmit the display of the display panel 120.

As illustrated in FIG. 4, a touch panel 130 is attached to the inner surface 20 of the cover member 2. The display panel 120 being a display is attached to the surface opposite to the surface of the inner surface 20 side of the touch panel 130. That is, the display panel 120 is installed on the inner surface 20 of the cover member 2 with the touch panel 130 therebetween. Furthermore, the display panel 120 is sandwiched between the cover member 2 and the front-side case 3. A portion of the cover member 2 facing the display panel 120 is the display portion 2*a*. The user can provide various instructions to the electronic apparatus 1 by operating the display portion 2*a* of the cover member 2 using the finger or the like.

As illustrated in FIGS. 1, 2, and 6, provided in the lower edge portion of the cover member 2 is a microphone hole 50. As illustrated in FIG. 3, provided on the rear surface 10 of the electronic apparatus 1, specifically, are speaker holes 80 on an external surface of the cover member 41 of the rear-side case 4.

Provided in the inside of the outer case 5 are a proximity sensor 140, a front imaging unit 160, a rear imaging unit 170, and the piezoelectric vibration element 190, which will be described below. As illustrated in FIGS. 4 and 5, the piezoelectric vibration element 190 is attached to the inner surface 20 of the cover member 2 with a bonding material 250. Provided at the upper edge portion of the cover member 2 is a proximity-sensor transparent part 60, through which the proximity sensor 140 in the outer case 5 is visually recognized from the outside of the electronic apparatus 1. The proximity sensor 140 is attached to the proximity-sensor transparent part 60 from the inner side thereof. Provided at the upper edge portion of the cover member 2 is a front-surface-lens transparent part 70, through which an imaging lens of the front imaging unit 160 in the outer case 5 is visually recognized from the outside of the electronic apparatus 1. Provided on the rear surface 10 of the electronic apparatus 1 is a rear-surface-lens transparent part 90, through which an imaging lens of the rear imaging unit 170 in the outer case 5 is visually recognized from the outside of the electronic apparatus 1.

As illustrated in FIG. 4, the cover member 2 is attached to the front-side case 3 with a bonding material 260. Specifically, the inner surface 20 of the cover member 2 is attached to the front-side case 3 through the bonding material 260. FIG. 6 illustrates the bonding material 260 with hatch lines. As illustrated in FIG. 6, the perimeter of a peripheral edge portion 211 of the inner surface 20 of the cover member 2 is attached to the front-side case 3 with the bonding material 260. The bonding material 260 may be a double-sided tape or an adhesive.

[Electrical Configuration of Electronic Apparatus]

FIG. 7 illustrates a block diagram mainly showing an electrical configuration of the electronic apparatus 1. As illustrated in FIG. 7, the electronic apparatus 1 includes a controller 100, a wireless communication unit 110, the display panel 120, the touch panel 130, and the proximity sensor 140. The electronic apparatus 1 further includes a microphone 150, the front imaging unit 160, the rear imaging unit 170, an external speaker 180, the piezoelectric vibration element 190, and the battery 200. The outer case 5 accommodates the respective elements, except for the cover member 2, of the electronic apparatus 1.

The controller 100 includes the CPU 101, the DSP 102, and a storage 103. The controller 100 can manage the overall operation of the electronic apparatus 1 by controlling the other elements of the electronic apparatus 1.

The storage 103 includes a non-transitory recording medium that can be read by the controller 100 (the CPU 11 and the DSP 12), such as a read only memory (ROM) and a random access memory (RAM). A main program, a plurality of application programs, and the like are stored in the storage 103, the main program being a control program for controlling the electronic apparatus 1, specifically, for controlling respective elements such as the wireless communication unit 110, the display panel 120, and the like of the electronic apparatus 1. Various functions of the controller 10 can be enabled by the CPU 101 and the DSP 102 by executing various programs in the storage 103.

The storage 103 may include a non-transitory computer-readable recording medium other than the ROM and the RAM. The storage 103 may include, for example, a compact hard disk drive and a solid-state drive (SSD).

The wireless communication unit 110 includes an antenna 111. In the wireless communication unit 110, the antenna 111 can receive a signal from a mobile phone different from the electronic apparatus 1, or from a communication device such as a web server connected to the Internet via a base station. The wireless communication unit 110 can perform an amplification process and down conversion on the received signal and output the signal to the controller 100. The controller 100 can perform demodulation processing or the like on the input signal, and acquire a sound signal (sound information) indicating a voice or music included in the received signal.

The wireless communication unit 110 can perform up-converting and the amplification process on a transmission signal including a sound signal or the like generated in the controller 100, and wirelessly transmit the transmission signal after the process from the antenna 111. The transmission signal from the antenna 111 can be received in a communication device connected to the Internet or a mobile phone different from the electronic apparatus 1 via the base station.

The display panel 120 being a display is, for example, a liquid crystal display panel or an organic electro luminescent (EL) panel. The display panel 120 can display various pieces of information such as characters, symbols, and figures by control of the controller 100. The information displayed in the display panel 120 can be visually recognized by the user of the electronic apparatus 1 through the display portion 2*a* of the cover member 2.

The touch panel 130 is, for example, a projection type electrostatic capacitance touch panel. The touch panel 130 can detect contact of an object with respect to the display portion 2*a* of the cover member 2. The touch panel 130 is attached to the inner surface 20 of the cover member 2. The touch panel 130 includes two sheet-shaped electrode sensors opposed to each other. The two electrode sensors are bonded to each other through a transparent adhesive sheet.

Formed in one of the electrode sensors are a plurality of long and narrow X electrodes that extend along an X-axis direction (for example, the horizontal direction of the electronic apparatus 1) and are disposed parallel to one another. Formed in the other electrode sensor are a plurality of long and narrow Y electrodes that extend along a Y-axis direction (for example, the vertical direction of the electronic apparatus 1) and are disposed parallel to one another. When the finger or the like of the user contacts the display portion 2*a* of the cover member 2, the capacitance between the X electrode and the Y electrode below the contacted portion changes. Thus, the touch panel 130 can detect an operation (contact) of the cover member 2 with the display portion 2*a*. The touch panel 130 can generate an electrical signal indicating the capacitance change between the X electrode and the Y electrode and output the electrical signal to the controller 100. The controller 100 can specify the details of an operation performed on the display portion 2*a* of the cover member 2 based on the electrical signal and perform an operation according to the specified details.

The proximity sensor 140 is, for example, an infrared type proximity sensor. The proximity sensor 140 can output a detection signal when an object approaches the proximity sensor 140 within a predetermined distance. The detection signal is input to the controller 100. When the controller 100 receives the detection signal from the proximity sensor 140, for example, the controller 100 can stop a function of detecting an operation of the touch panel 130.

The front imaging unit 160 includes an imaging lens, an image sensor, and the like. The front imaging unit 160 can image a still image and a moving image based on the control by the controller 100. The imaging lens of the front imaging unit 160 can be visually recognized from the front-surface-lens transparent part 70 on the front surface of the electronic apparatus 1. Therefore, the front imaging unit 160 can image an object in front of the surface side (cover member 2 side) of the electronic apparatus 1.

The rear imaging unit 170 includes an imaging lens, an image sensor, and the like. The rear imaging unit 170 can image a still image and a moving image based on the control by the controller 100. The imaging lens of the rear imaging unit 170 can be visually recognized from the rear-surface-lens transparent part 90 on the rear surface 10 of the electronic apparatus 1. Therefore, the rear imaging unit 170 can image an object in front of the rear surface 10 side of the electronic apparatus 1.

The microphone 150 can output a sound from the outside of the electronic apparatus 1 to the controller 100 by converting the sound into an electric sound signal. The sound from the outside of the electronic apparatus 1 is received by the microphone 150 through the microphone hole 50 provided on the front surface of the cover member 2. The microphone hole 50 may be provided on the side surface of the electronic apparatus 1 or may be provided on the rear surface 10.

The external speaker 180 is, for example, a dynamic speaker. The external speaker 180 can convert an electric sound signal from the controller 100 into a sound and then output the sound. The sound output from the external speaker 180 is output from the speaker holes 80 provided on the rear surface 10 of the electronic apparatus 1 to the outside. The volume of the sound output from the speaker holes 80 can be set to a degree such that the sound can be heard at a location separated from the electronic apparatus 1.

As described above, the piezoelectric vibration element 190 is attached to the inner surface 20 of the cover member 2 disposed on the front surface of the electronic apparatus 1 with the bonding material 250. The bonding material 250 may be a double-sided tape or an adhesive. The piezoelectric vibration element 190 can be vibrated by a drive voltage provided from the controller 100. The controller 100 can generate the drive voltage based on a sound signal, and provide the drive voltage to the piezoelectric vibration element 190. The piezoelectric vibration element 190 is vibrated by the controller 100 based on a sound signal, and accordingly the cover member 2 is vibrated based on the sound signal. Consequently, a reception sound is transmitted from the cover member 2 to the user. The volume of the reception sound can be set to a degree such that the user can hear the sound when moving the cover member 2 close to an ear. The reception sound transmitted from the cover member 2 to the user will be described below in detail.

The battery 200 can output the power for the electronic apparatus 1. The power output from the battery 200 is supplied to the respective electronic components such as the controller 100 and the wireless communication unit 110 of the electronic apparatus 1.

[Details of Piezoelectric Vibration Element]

Figure 8:
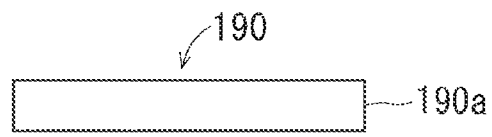
FIG. 8 illustrates a top view showing a structure of a piezoelectric vibration element.
Figure 9:
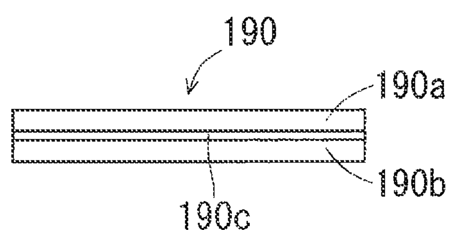
FIG. 9 illustrates a side view showing the structure of the piezoelectric vibration element.

FIGS. 8 and 9 illustrate a top view and a side view, respectively, showing a structure of the piezoelectric vibration element 190. As illustrated in FIGS. 8 and 9, the piezoelectric vibration element 190 has a long shape in one direction. Specifically, the piezoelectric vibration element 190 has a long and narrow rectangular plate shape in a plan view. The piezoelectric vibration element 190 has, for example, a bimorph structure. The piezoelectric vibration element 190 includes a first piezoelectric ceramic plate 190*a* and a second piezoelectric ceramic plate 190*b* which are bonded to each other through a shim material 190*c* therebetween.

In the piezoelectric vibration element 190, when a positive voltage is applied to the first piezoelectric ceramic plate 190*a* and a negative voltage is applied to the second piezoelectric ceramic plate 190*b*, the first piezoelectric ceramic plate 190*a* extends along the longitudinal direction and the second piezoelectric ceramic plate 190*b* contracts along the longitudinal direction. Accordingly, as illustrated in FIG. 10, the piezoelectric vibration element 190 bents into a convex with the first piezoelectric ceramic plate 190*a* being the outside.

In the piezoelectric vibration element 190, when a negative voltage is applied to the first piezoelectric ceramic plate 190*a* and a positive voltage is applied to the second piezoelectric ceramic plate 190*b*, the first piezoelectric ceramic plate 190*a* contracts along the longitudinal direction and the second piezoelectric ceramic plate 190*b* extends along the longitudinal direction. Accordingly, as illustrated in FIG. 11, the piezoelectric vibration element 190 is bent into a convex with the second piezoelectric ceramic plate 190*b* being the outside.

Figure 10:
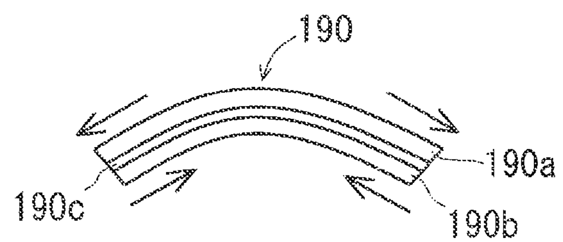
FIG. 10 illustrates how the piezoelectric vibration element produces flexural vibrations.
Figure 11:
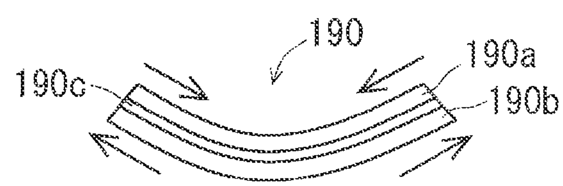
FIG. 11 illustrates how the piezoelectric vibration element produces flexural vibrations.

The piezoelectric vibration element 190 produces flexural vibrations along the longitudinal direction by alternately taking the state of FIG. 10 and the state of FIG. 11. In other words, the piezoelectric vibration element 190 vibrates while being bent along the longitudinal direction by alternately taking the state of FIG. 10 and the state of FIG. 11. The controller 100 allows the piezoelectric vibration element 190 to produce flexural vibrations in the longitudinal direction by applying an alternating current (AC) voltage, in which a positive voltage and a negative voltage alternately appear, between the first piezoelectric ceramic plate 190*a* and the second piezoelectric ceramic plate 190*b*.

As illustrated in FIG. 6, the piezoelectric vibration element 190 having such a structure is located on the peripheral edge portion 211 of the inner surface 20 of the cover member 2. Specifically, the piezoelectric vibration element 190 is located on a central portion at the upper edge portion of the inner surface 20 of the cover member 2 in the horizontal direction DR2. Furthermore, the piezoelectric vibration element 190 is disposed in such a manner that a longitudinal direction of the piezoelectric vibration element 190 is along the short-side direction DR2 of the cover member 2. Accordingly, the piezoelectric vibration element 190 produces flexural vibrations along the short-side direction DR2 of the cover member 2. Further, the center of the piezoelectric vibration element 190 in the longitudinal direction corresponds to the center of the upper edge portion of the inner surface 20 of the cover member 2 in the short-side direction DR2.

As illustrated in FIGS. 10 and 11, the center of the piezoelectric vibration element 190 in the longitudinal direction has the largest displacement amount when the piezoelectric vibration element 190 is vibrating while being bent. Accordingly, an area of the center of the upper edge portion of the inner surface 20 of the cover member 2 in the short-side direction DR2, which corresponds to the center of the piezoelectric vibration element 190 in the longitudinal direction, has the largest displacement amount of bending and vibrating.

Furthermore, a partial region 220 in the upper edge portion of the cover member 2, to which the front-side case 3 and the display panel 120 are not attached, is longer in the short-side direction DR2 of the cover member 2. Thus, the partial region 220 is bent in the short-side direction DR2 more easily than in the longitudinal direction DR1, due to its shape. Since the piezoelectric vibration element 190 in the longitudinal direction (bending and vibrating directions) is disposed in the partial region 220 along the longitudinal direction of the partial region 220, the partial region 220 easily vibrates. Thus, a reception signal is easily transmitted from the cover member 2 to the user.

Although FIGS. 8 to 11 illustrate the piezoelectric vibration element 190 with only one structure in which the first piezoelectric ceramic plate 190*a* and the second piezoelectric ceramic plate 190*b* are bonded together with the shim material 190*c* therebetween, two or more of such structures may be laminated to form the piezoelectric vibration element 190. The number of layers of the laminated structures to form the piezoelectric vibration element 190 is preferably equal to or more than 28, and more preferably equal to or more than 44. Accordingly, sufficient vibration can be transmitted to the cover panel 2.

Furthermore, the piezoelectric vibration element 190 may contain an organic piezoelectric material such as polyvinylidene difluoride (PVDF) or a polylactic acid, besides the piezoelectric ceramic materials. Specifically, the piezoelectric vibration element 190 may include, for example, first and second piezoelectric plates that are mutually laminated and contain a polylactic acid film. A transparent electrode containing, for example, indium tin oxide (ITO) may be used as an electrode provided in the piezoelectric plates.

[Generation of Reception Sound]

In the electronic apparatus 1 according to one embodiment, the piezoelectric vibration element 190 causes the cover member 2 to vibrate so that air conduction sound and tissue conduction sound are transmitted from the cover member 2 to the user. In other words, a vibration of the piezoelectric vibration element 190 itself is transmitted to the cover member 2 so that the air conduction sound and the tissue conduction sound are transmitted from the cover member 2 to the user.

Here, the term "air conduction sound" is a sound recognized in the human brain by the vibrations of an eardrum due to a sound wave (air vibration) which enters an external auditory meatus hole (a so-called "ear hole"). On the other hand, the term "tissue conduction sound" is a sound recognized in the human brain by the vibration of the eardrum due to the vibration of an auricle transmitted to the eardrum. Hereinafter, the air conduction sound and the tissue conduction sound will be described in detail.

FIG. 12 illustrates a view for describing the air conduction sound and the tissue conduction sound. FIG. 12 illustrates the structure of the ear of the user of the electronic apparatus 1. In FIG. 12, a dotted line 400 indicates a conduction path of a sound signal (sound information) while the air conduction sound is recognized in the human brain. A solid line 410 indicates a conduction path of a sound signal while the tissue conduction sound is recognized in the human brain.

When the piezoelectric vibration element 190 mounted on the cover member 2 vibrates based on the electric sound signal indicating the reception sound, the cover member 2 vibrates, and a sound wave is output from the cover member 2. When the user moves the cover member 2 of the electronic apparatus 1 to an auricle 300 of the user by holding the electronic apparatus 1 in a hand, or the cover member 2 of the electronic apparatus 1 is set to (brought into contact with) the auricle 300 of the user, the sound wave output from the cover member 2 enters an external auditory meatus hole 310. The sound wave from the cover member 2 travels through the external auditory meatus hole 310 and causes an eardrum 320 to vibrate. The vibration of the eardrum 320 is transmitted to an auditory ossicle 330, and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350, and the reception sound is recognized in the brain. In this manner, the air conduction sound is transmitted from the cover member 2 to the user.

Further, when the user puts the cover member 2 of the electronic apparatus 1 to the auricle 300 of the user by holding the electronic apparatus 1 in a hand, the auricle 300 is vibrated by the cover member 2, which is vibrated by the piezoelectric vibration element 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain through the acoustic nerve 350, and the reception sound is recognized in the brain. In this manner, the tissue conduction sound is transmitted from the cover member 2 to the user. FIG. 12 illustrates an auricle cartilage 300*a* in the inside of the auricle 300.

Bone conduction sound is a sound recognized in the human brain by the vibration of the skull and direct stimulation of the inner ear such as the cochlea caused by the vibration of the skull. In FIG. 12, in a case where a jawbone 500 vibrates, the transmission path of the sound signal while the bone conduction sound is recognized in the brain is indicated by a plurality of arcs 420.

As described above, in one embodiment, the air conduction sound and the tissue conduction sound can be transmitted from the cover member 2 to the user of the electronic apparatus 1 due to an appropriate vibration of the cover member 2 through the vibration of the piezoelectric vibration element 190. The user can hear the air conduction sound from the cover member 2 by moving the cover member 2 close to an ear (auricle). Further, the user can hear the air conduction sound and the tissue conduction sound from the cover member 2 by bringing the cover member 2 into contact with an ear (auricle). The structure of the piezoelectric vibration element 190 according to one embodiment is contrived to appropriately transmit the air conduction sound and the tissue conduction sound to the user. Various advantages are achieved by configuring the electronic apparatus 1 to transmit the air conduction sound and the tissue conduction sound to the user.

Since the user can hear a sound when putting the cover member 2 to the ear, communication using the electronic apparatus 1 can be performed without much concerning of the position of the electronic apparatus 1 with respect to the ear.

If there is a large amount of ambient noise, the user can make it difficult to hear the ambient sound by strongly putting the cover member 2 to the ear while turning up the volume of the tissue conduction sound. Accordingly, the user can appropriately perform communication even when there is a large amount of the ambient noise.

In addition, even with earplugs or earphones on his/her ears, the user can recognize the reception sound from the electronic apparatus 1 by putting the cover member 2 to the ear (more specifically, the auricle). Further, even with headphones on his/her ears, the user can recognize the reception sound from the electronic apparatus 1 by putting the cover member 2 to the headphones.

The portion of the cover member 2, on which the piezoelectric vibration element 190 is mounted, vibrates relatively easily. Thus, the user can hear the sound from the cover member 2 by moving the upper edge portion (particularly, a central portion of the upper edge portion in the short-side direction DR2) of the cover member 2, on which the piezoelectric vibration element 190 is mounted, close to the ear or putting the portion to the ear.

[Bending of Cover Member]

According to one embodiment, the first main surface (inner surface) 20 and the second main surface (outer surface) 21 of the cover member 2 are parallel to an a-plane of the sapphire. Furthermore, the longitudinal direction DR1 of the cover member 2 is parallel to a c-axis of the sapphire. Furthermore, the short-side direction DR2 of the cover member 2 is parallel to an m-axis of the sapphire. The m-axis is parallel to the a-plane, and vertical to the c-axis.

Here, the crystalline structure of the sapphire has anisotropy. The sapphire having the surface parallel to the a-plane bends in a direction parallel to the m-axis more easily than in a direction parallel to the c-axis, due to the anisotropy of the crystalline structure.

According to one embodiment, the inner surface 20 and the outer surface 21 of the cover member 2 are parallel to the a-plane of the sapphire, and the longitudinal direction DR1 of the cover member 2 is parallel to the c-axis of the sapphire. Thus, the cover member 2 bents in the short-side direction DR2 more easily than in the longitudinal direction DR1, from the viewpoint of the anisotropy of the crystalline structure of the sapphire. FIG. 13 illustrates how the cover member 2 is bent in the longitudinal direction DR1. FIG. 14 illustrates how the cover member 2 is bent in the short-side direction DR2. The result of the tests to validate how easy the sapphire is bent will be described hereinafter.

Figure 15:
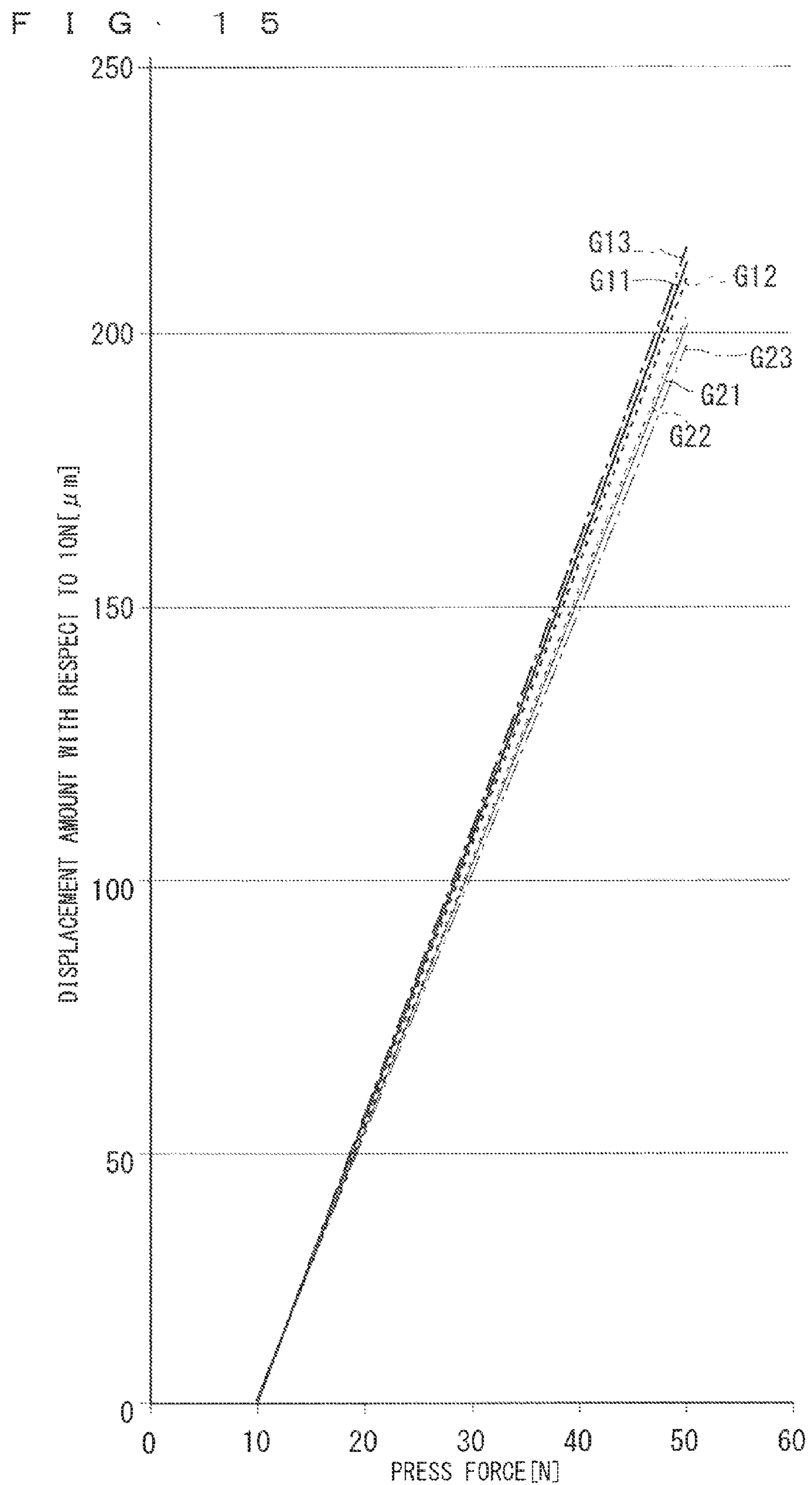
FIG. 15 illustrates graphs showing a result of tests to validate how easy a sample panel is bent.
Figure 16:
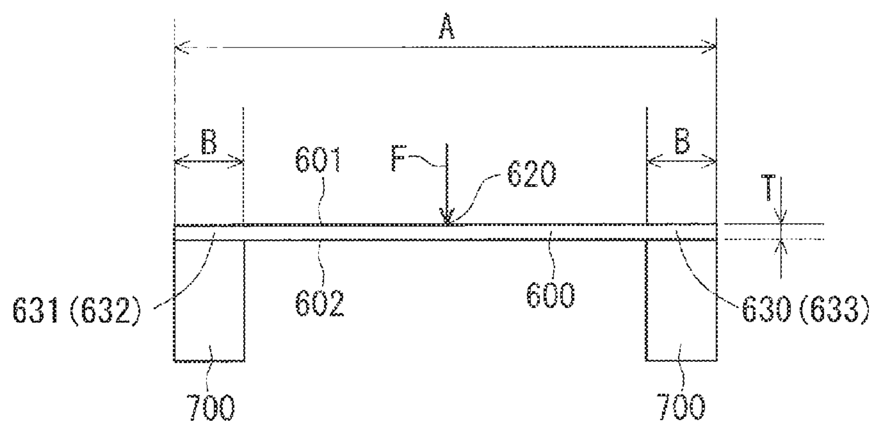
FIG. 16 illustrates a method for conducting the tests to validate how easy the sample panel is bent.
Figure 17:
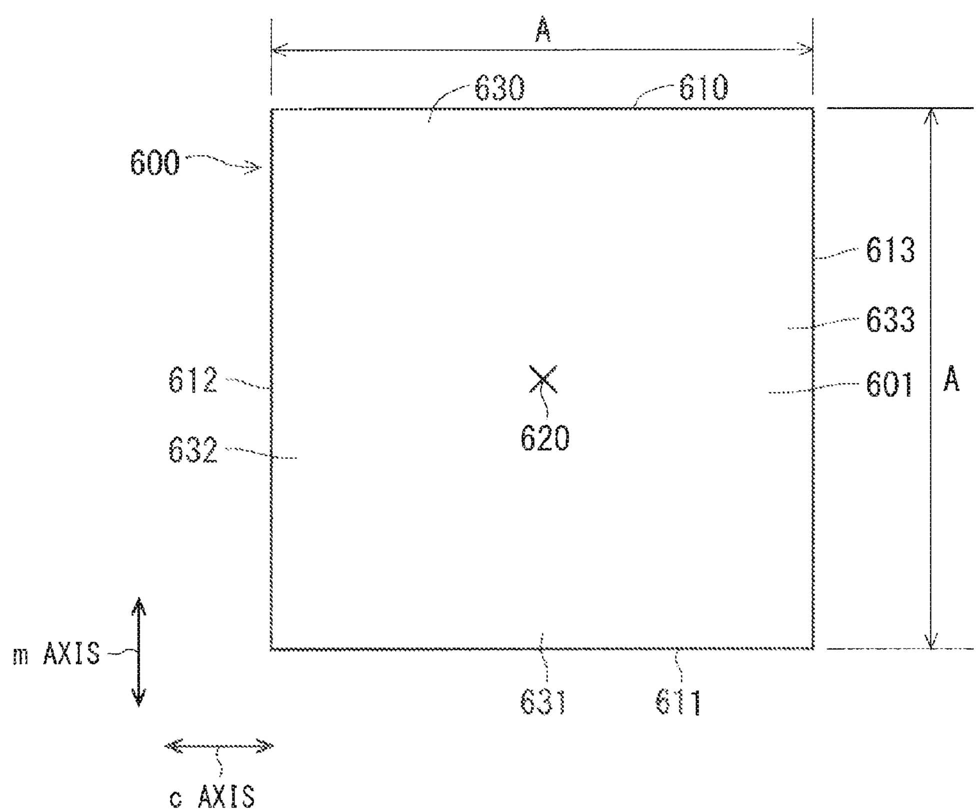
FIG. 17 illustrates a plan view showing the sample panel.

FIG. 15 illustrates graphs showing a result of the tests to validate how easy a sample panel 600 made of sapphire is bent (hereinafter referred to as "bending validation tests"). FIG. 16 illustrates a method for conducting the bending validation tests. FIG. 17 illustrates a plan view showing the sample panel 600.

As illustrated in FIGS. 16 and 17, the sample panel 600 has a first main surface 601 and a second main surface 602 opposite to the first main surface 601, and is a square. A length A of one side of the sample panel 600 is 62 mm, and a thickness T of the sample panel 600 is 0.475 mm.

The first main surface 601 and the second main surface 602 are parallel to the a-plane of the sapphire. Sides 610 and 611 of the sample panel 600 that are parallel to each other are parallel to the c-axis of the sapphire. Furthermore, sides 612 and 613 of the sample panel 600 that are parallel to each other are parallel to the m-axis vertical to the c-axis.

As illustrated in FIG. 16, the sample panel 600 is placed on an iron stand 700 in the bending validation tests. Here, the sample panel 600 is not fixed but merely placed on the stand 700. The displacement amount of a center portion 620 of the sample panel 600 on the stand 700 is measured with application of a press force F to the center portion 620. The press force F is applied to the center portion 620 of the sample panel 600 by pressing a rod part onto the center portion 620. In the bending validation tests, the press force F changes at a constant speed, and the displacement amount of the center portion 620 of the sample panel 600 is measured with each of the press forces F. The rate of change in the press forces F is 5 N per second. The displacement amount of the center portion 620 will be simply referred to as "displacement amount" hereinafter.

In the bending validation tests, a displacement amount when the sample panel 600 is bent in a direction parallel to the m-axis (hereinafter referred to as "first displacement amount"), and a displacement amount when the sample panel 600 is bent in a direction parallel to the c-axis (hereinafter referred to as "second displacement amount") are measured. When the first displacement amount is measured, the press force F is applied to the center portion 620 of the sample panel 600, in a state where an edge portion 630 with a width B that includes the side 610, and an edge portion 631 with the width B that includes the side 611 in the sample panel 600 are supported by the stand 700. The width B is set to 12.5 mm. Furthermore, when the second displacement amount is measured, the press force F is applied to the center portion 620 of the sample panel 600, in a state where an edge portion 632 with the width B that includes the side 612, and an edge portion 633 with the width B that includes the side 613 in the sample panel 600 are supported by the stand 700.

FIG. 15 indicates the first and second displacement amounts when the press force F changes from 10 N to 50N. The horizontal axis of FIG. 15 represents the press force F, and the vertical axis of FIG. 15 represents the first and second displacement amounts with respect to 10 N of the press force F. Graphs G11, G12, and G13 in FIG. 15 are approximate linear lines of the results of the first, second, and third measurements of the first displacement amount, respectively. Furthermore, graphs G21, G22, and G23 are approximate linear lines of the results of the first, second, and third measurements of the second displacement amount, respectively.

As illustrated in FIG. 15, the slopes of the graphs G11, G12, and G13 indicating the first displacement amount are larger than those of the graphs G21, G22, and G23 indicating the second displacement amount. This means that the square sample panel 600 is bent in the direction parallel to the m-axis more easily than in the direction parallel to the c-axis. Accordingly, the sapphire having the surface parallel to the a-plane is bent in the direction parallel to the m-axis more easily than in the direction parallel to the c-axis, due to the anisotropy of the crystalline structure.

Thus, the cover member 2 according to one embodiment is bent in the short-side direction DR2 more easily than in the longitudinal direction DR1, from the viewpoint of the anisotropy of the crystalline structure of the sapphire. In other words, the cover member 2 is bent in the short-side direction DR2 more easily than in the longitudinal direction DR1 from the viewpoint of ease of bending based on the crystalline structure. Furthermore, the piezoelectric vibration element 190 produces flexural vibrations, along the short-side direction DR2 of the cover member 2 as described above. Thus, the cover member 2 easily vibrates according to the flexural vibrations of the piezoelectric vibration element 19. As a result, the air conduction sound and the tissue conduction sound (reception sound) are easily transmitted to the user.

Furthermore, since the cover member 2 is made of sapphire according to one embodiment, the display portion 2*a* of the cover member 2, that is, a portion of the cover member 2 to be operated by the user is hard to be damaged.

Furthermore, since the cover member 2 has a long shape in one direction, it is bent in the longitudinal direction DR1 more easily than in the short-side direction DR2, from the viewpoint of the shape of the cover member 2. However, it is more difficult to bend the cover member 2 in the longitudinal direction DR1 than in the short-side direction DR2, from the viewpoint of the anisotropy of the crystalline structure of the sapphire. Thus, it is more difficult to bend the cover member 2 in the longitudinal direction DR1. Consequently, the cover member 2 hardly cracks or is chipped.

The fact that the cover member 2 is bent in the short-side direction DR2 more easily than in the longitudinal direction DR1, from the viewpoint of the anisotropy of the crystalline structure of the sapphire does not always mean that the cover member 2 is bent in the short-side direction DR2 more easily than in the longitudinal direction DR1 from an objective standpoint. Similarly, the fact that the cover member 2 is bent in the longitudinal direction DR1 more easily than in the short-side direction DR2 from the viewpoint of its shape does not always mean that the cover member 2 is bent in the longitudinal direction DR1 more easily than in the short-side direction DR2 from an objective standpoint.

Although the piezoelectric vibration element 190 is one in the examples above, a plurality of the piezoelectric vibration elements 190 may be provided on the inner surface 20 of the cover member 2 as illustrated in FIG. 18. In the example of FIG. 18, the plurality of the piezoelectric vibration elements 190 are arranged in the short-side direction DR2 of the cover member 2. Furthermore, each of the piezoelectric vibration elements 190 in the longitudinal direction is disposed along the short-side direction DR2 of the cover member 2. Although two of the piezoelectric vibration elements 190 are used in the example of FIG. 18, three or more of the piezoelectric vibration elements 190 may be provided.

Although the embodiments of the present disclosure are applied to mobile phones in the above description, the embodiments are applicable to any having a function of vibrating cover members while being bent, using vibration elements. The embodiments are applicable to, for example, tablet terminals, watches, glasses, headphones, wigs, belts, portable recorders, and portable players besides the mobile phones including smartphones.

While the electronic apparatus 1 is described in detail above, the foregoing description is in all aspects illustrative and not restrictive. The various modifications described above may be combined with one another unless any contradiction occurs. It is understood that numerous modifications that have not yet been described can be devised without departing from the scope of the present disclosure.

The invention claimed is:

1. An electronic apparatus, comprising:

a display;

a cover member including a first main surface that faces a display surface of the display, and a second main surface opposite to the first main surface, the cover member being made of a crystalline material; and a vibration element disposed on the first main surface, the vibration element producing flexural vibrations in the cover member, wherein cover member includes a longitudinal direction DR1 and a short-side direction DR2, and the cover member is bent in the short-side direction DR2 more easily than in the longitudinal direction DR1, from the viewpoint of the anisotropy of the crystalline material, and the vibration element produces flexural vibrations along the short-side direction DR2.

2. The electronic apparatus according to claim 1, wherein the crystalline material is one selected from the group consisting of sapphire, diamond, zirconia, titania, crystal, lithium tantalite, and aluminum oxynitride.

3. The electronic apparatus according to claim 1, wherein lengths of the first and second main surfaces in the longitudinal direction DR1 are greater than lengths of the first and second main surfaces in the short-side direction DR2.

4. The electronic apparatus according to claim 2, wherein the crystalline material is sapphire, and the first and second main surfaces are parallel to an a-plane of the sapphire, and the longitudinal direction DR1 is parallel to a c-axis of the sapphire.

5. The electronic apparatus according to claim 1, further comprising a controller that vibrates the vibration element based on a sound signal, wherein the vibration element causes the cover member to vibrate so that air conduction sound and tissue conduction sound are transmitted from the cover member to a user.

6. The electronic apparatus according to claim 1, wherein the longitudinal direction DR1 of the cover member includes a top end and a bottom end, and the short-side direction DR2 of the cover member includes opposite sides, and the vibration element is disposed adjacent to the top end of the cover member.

* * * * *